United States Patent

Shintani et al.

Patent Number: 5,277,090
Date of Patent: Jan. 11, 1994

[54] DISC CUTTING APPARATUS

[75] Inventors: Rhoei Shintani, Tokyo; Masatada Sekine, Waco; Yoshio Ishizaka, Hidaka; Nobuyoshi Fukuda, Warabi; Masahito Eda, Waco; Yoshikazu Kumaki, Kawagoe; Haruo Tanaka, Asaka; Shouichi Kitagawa, Nagoya; Kazumi Nakano, Handa, all of Japan

[73] Assignee: Honda Giken Kogyo Kabushiki Kaisha, Tokyo, Japan

[21] Appl. No.: 898,415

[22] Filed: Jun. 15, 1992

[30] Foreign Application Priority Data

Jul. 8, 1991 [JP] Japan .................. 3-167242

[51] Int. Cl.⁵ ............................. B23B 5/00
[52] U.S. Cl. ....................... 82/112; 82/123; 82/164
[58] Field of Search .............. 82/112, 118, 123, 164

[56] References Cited

U.S. PATENT DOCUMENTS

| | | | |
|---|---|---|---|
| 3,225,631 | 12/1965 | Hermann | 82/164 |
| 4,151,766 | 5/1979 | Eichenhofer | 82/4 A |
| 4,266,454 | 5/1981 | Mitchell et al. | 82/1 C |
| 4,653,360 | 3/1987 | Compton | 82/18 |
| 4,905,551 | 3/1990 | Blaimschein | 82/1.11 |

FOREIGN PATENT DOCUMENTS

| | | | |
|---|---|---|---|
| 59-37002 | 2/1984 | Japan . | |
| 62-218042 | 9/1987 | Japan . | |
| 1240499 | 6/1986 | U.S.S.R. | 82/123 |

Primary Examiner—Mark Rosenbaum
Assistant Examiner—John M. Husar

[57] ABSTRACT

A disc cutting apparatus for cutting opposite surfaces of a disc-shaped workpiece such as a disc rotor for an automobile disc brake includes a rotating mechanism for positioning and rotating the workpiece which is pressed, under uniform pressure, radially inwardly by a plurality of holder mechanisms. While the workpiece is being rotated by the rotating mechanism and pressed by the pressing mechanism, the workpiece is cut by a cutting mechanism. The cutting mechanism includes cutters for cutting opposite surfaces of the workpiece, and the cutters are positionally adjusted with respect to the workpiece based on positional information detected by a detector which has a probe held against the workpiece.

14 Claims, 5 Drawing Sheets

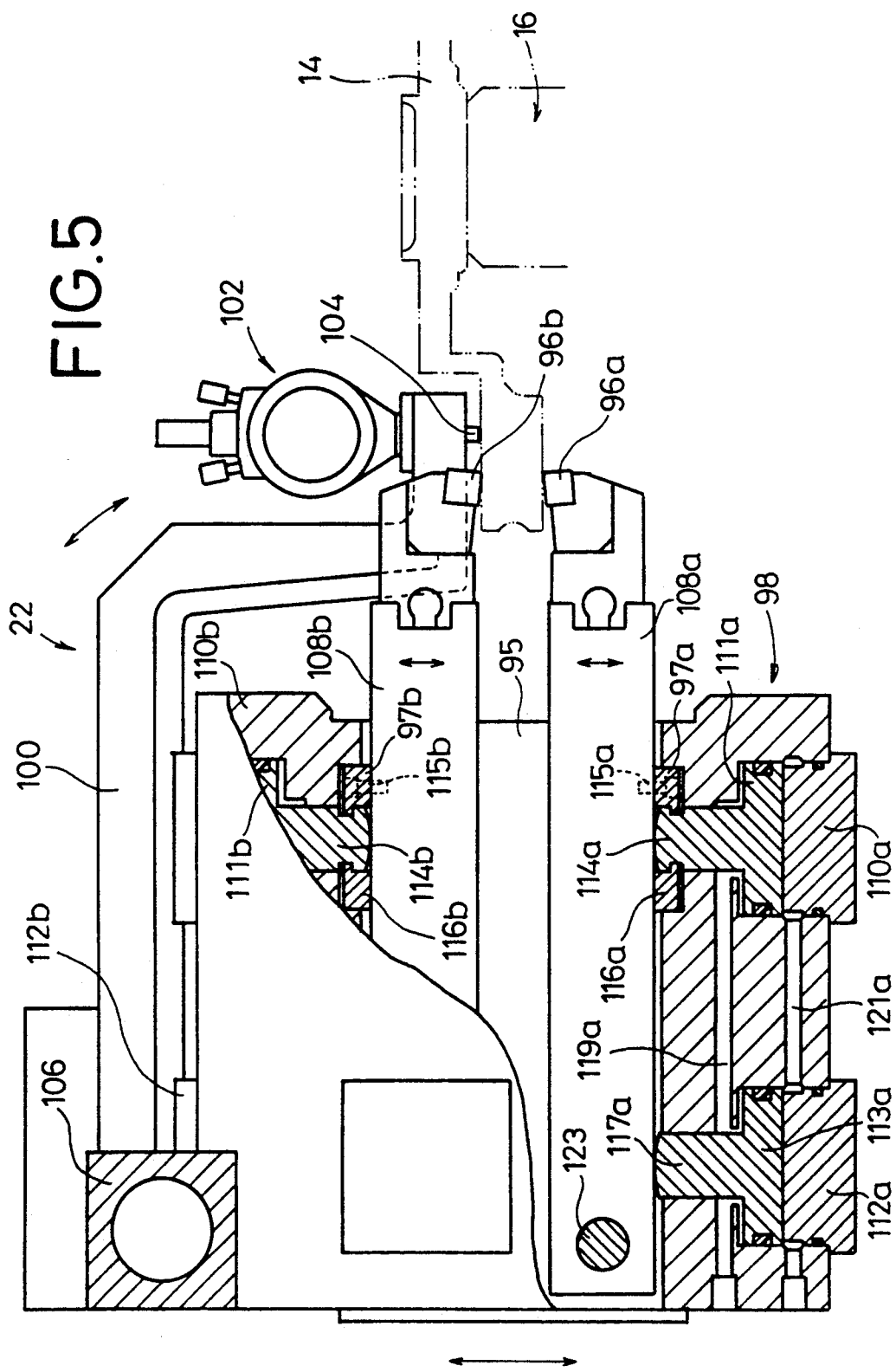

DISC CUTTING APPARATUS

BACKGROUND OF THE INVENTION

1. Field of the Invention:

The present invention relates to a disc cutting apparatus for cutting at least one surface of a disc-shaped workpiece which is being rotated, while pressing an outer circumferential surface of the workpiece at a plurality of locations thereon with a plurality of holder mechanisms to preventing the workpiece from swinging in the circumferential direction thereof and also from being displaced in the axial direction thereof.

2. Description of Background Art:

Disk-shaped workpieces such as disc rotors for use in automobile disc brakes are required to have parallel and flat surfaces on the both sides. Attempts have been made to hold disc rotors parallel to cutters while cutting the disc rotors, but they have proven unsatisfactory.

Disc rotor cutting apparatus are disclosed in Japanese laid-open patent publications Nos. 62-218042 and 59-37002 and U.S. Pat. No. 4,266,454, for example.

According to Japanese laid-open patent publication No. 62-218042, a sleeve has a cylinder defined therein and a rod with a piston movably disposed in the cylinder, the sleeve and the rod being coaxially placed in a body. Stoppers for controlling the strokes of the sleeve and the rod are attached to an outer end of the body, and tool bits are mounted on the other outer end of the body for simultaneously cutting the opposite surfaces of a disc rotor.

According to Japanese laid-open patent publication No. 62-218042 or U.S. Pat. No. 4,266,454, two cutter bases are fitted over a main spindle and support respective tool bits thereon. The opposite surfaces of a disc rotor are simultaneously cut by the tool bits while the disc rotor is rotating between the tool bits.

In the conventional disc cutting apparatus, the center of the disc rotor is required to be fitted over the main spindle perpendicularly thereto when the disc rotor is rotated and cut by the tool bits. If the disc rotor were slightly tilted with respect to the main spindle, the circumferential edge of the disc rotor would periodically be displaced axially, i.e., rotate in a tortuous path, with resulting chattering of the disc rotor. Therefore, the opposite surfaces of the disc rotor would have a chatter mark and not be machined to a smooth finish.

Removal of such a chatter mark requires the opposite surfaces of the disc rotor to be machined again by the disc cutting apparatus. Therefore, the entire process of cutting the disc rotor is lengthy and complex, and the rate of production of disc rotors is relatively low.

SUMMARY OF THE INVENTION

It is an object of the present invention to provide a disc cutting apparatus for cutting at least one surface of a disc-shaped workpiece which is being rotated, while pressing an outer circumferential surface of the workpiece at a plurality of locations thereon radially inwardly under uniform pressure with a plurality of holder mechanisms to prevent the workpiece from vibrating when it is being cut, from swinging in the circumferential direction thereof and also from being displaced in the axial direction thereof when the workpiece is in rotation, so that the workpiece can be cut without undesirable chatter marks thereon.

According to the present invention, there is provided a disc cutting apparatus comprising rotating means for positioning and rotating a workpiece, a plurality of holder mechanisms for pressing, under uniform pressure, the workpiece radially inwardly toward an axis about which the workpiece is rotated by the rotating means, a cutting mechanism for cutting the workpiece while the workpiece is being rotated by the rotating means and pressed by the holder mechanisms, and detecting means for producing positional information to position the cutting mechanism with respect to the workpiece.

The disc cutting apparatus further includes a presser mechanism for pressing a central region of the workpiece, the holder mechanisms including respective side rollers and respective actuators coupled respectively to the side rollers, for pressing the side rollers against an outer circumferential surface of the workpiece.

The presser mechanism comprises an actuator, a housing coupled to the actuator, a spherical roller bearing disposed in the housing, and a presser member supported on the spherical roller bearing for pressing the central region of the workpiece.

The detecting means comprises a probe for engaging the workpiece to produce the positional information.

The rotating means comprises a spindle mechanism, the spindle mechanism having a seat for supporting the workpiece fitted therein, and a collet disposed in the seat for securing the workpiece.

The rotating means includes workpiece seating means for holding the workpiece seated thereon and rotating the workpiece with the rotating means. The workpiece seating means comprises a collet, a tightening member associated with the collet, and a linear actuator for causing the tightening member to spread the collet to hold the workpiece. The linear actuator comprises a fluid pressure cylinder. The workpiece seating means has a fluid passage for supplying a fluid to remove chips from the workpiece.

Each of the holder mechanisms comprises pressing means for pressing the workpiece in abutment thereagainst, and an actuator for moving the pressing means into and out of abutment against the workpiece. The pressing means comprises a side roller and a cushioning member mounted on the side roller for engaging the workpiece.

The cutting mechanism comprises first and second cutter holder rods displaceable transversely with respect to the workpiece, and linear actuator means having a movable member engaging the first and second cutter holder rods. The linear actuator means comprise at least one fluid pressure cylinder associated with each of the first and second cutter holder rods. The fluid pressure cylinder has a piston rod, and a support coupled to a distal end of the piston rod and held against each of the first and second cutter holder rods, for positionally adjusting each of the first and second cutter holder rods in response to operation of the fluid pressure cylinder.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a fragmentary vertical cross-sectional view of a cutting mechanism of the disc cutting apparatus.

DETAILED DESCRIPTION OF THE PREFERRED EMBODIMENT

Figure 1:
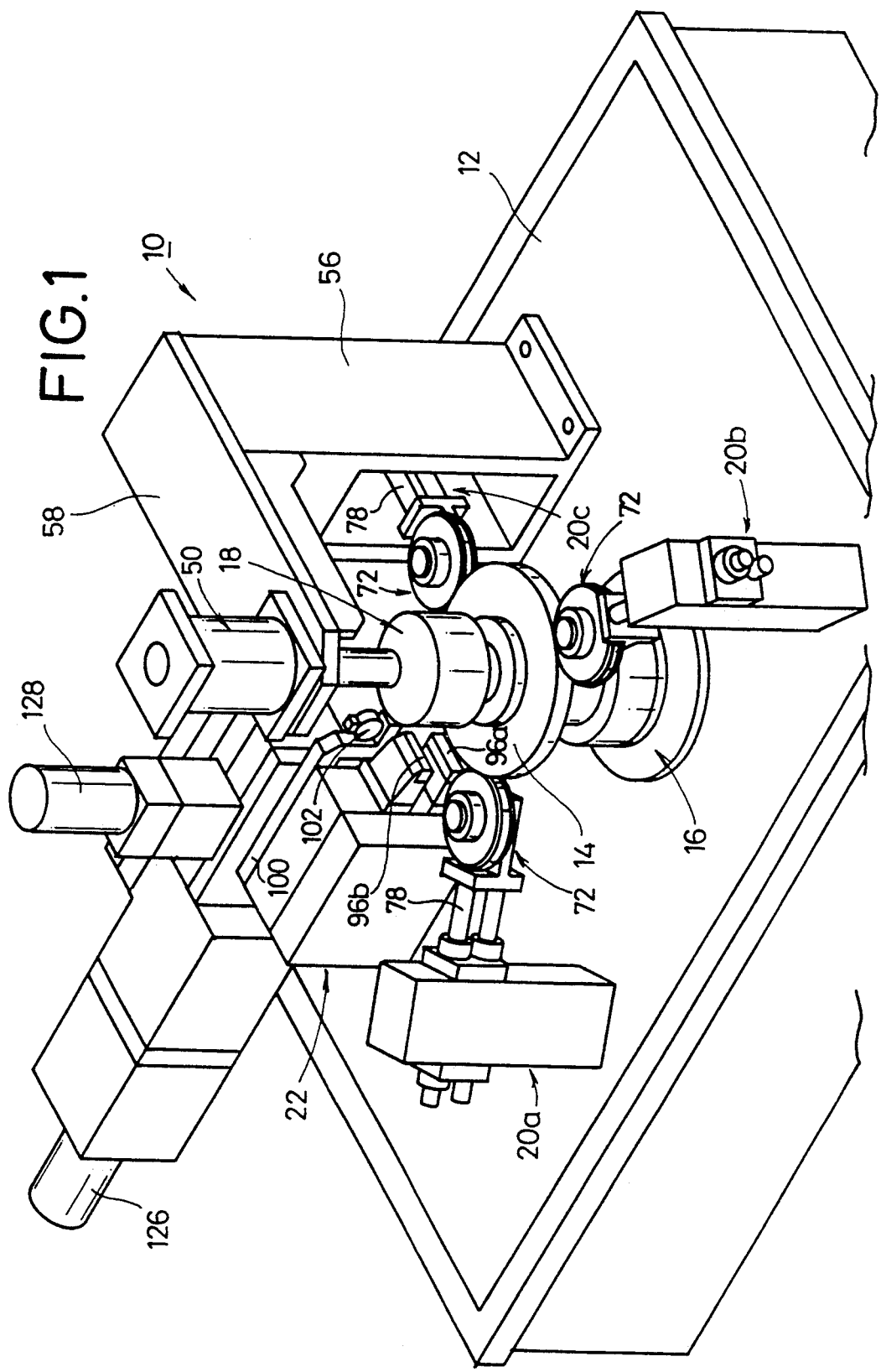
FIG. 1 is a perspective view of a disc cutting apparatus according to the present invention.

As shown in FIG. 1, a disc cutting apparatus, generally denoted at 10, basically comprises a rotating mechanism 16 mounted on a casing 12 for supporting and rotating a workpiece 14 such as a disc rotor, a plurality of holder mechanisms 20a, 20b, 20c mounted on the casing 12 for pressing the outer circumferential surface of the disc rotor 14 radially inwardly toward the center of the rotating mechanism 16, a cutting mechanism 22 for cutting the opposite surfaces of the disc rotor 14, and a detector 102 for detecting the extent to which the disc rotor 14 is cut.

Figure 2:
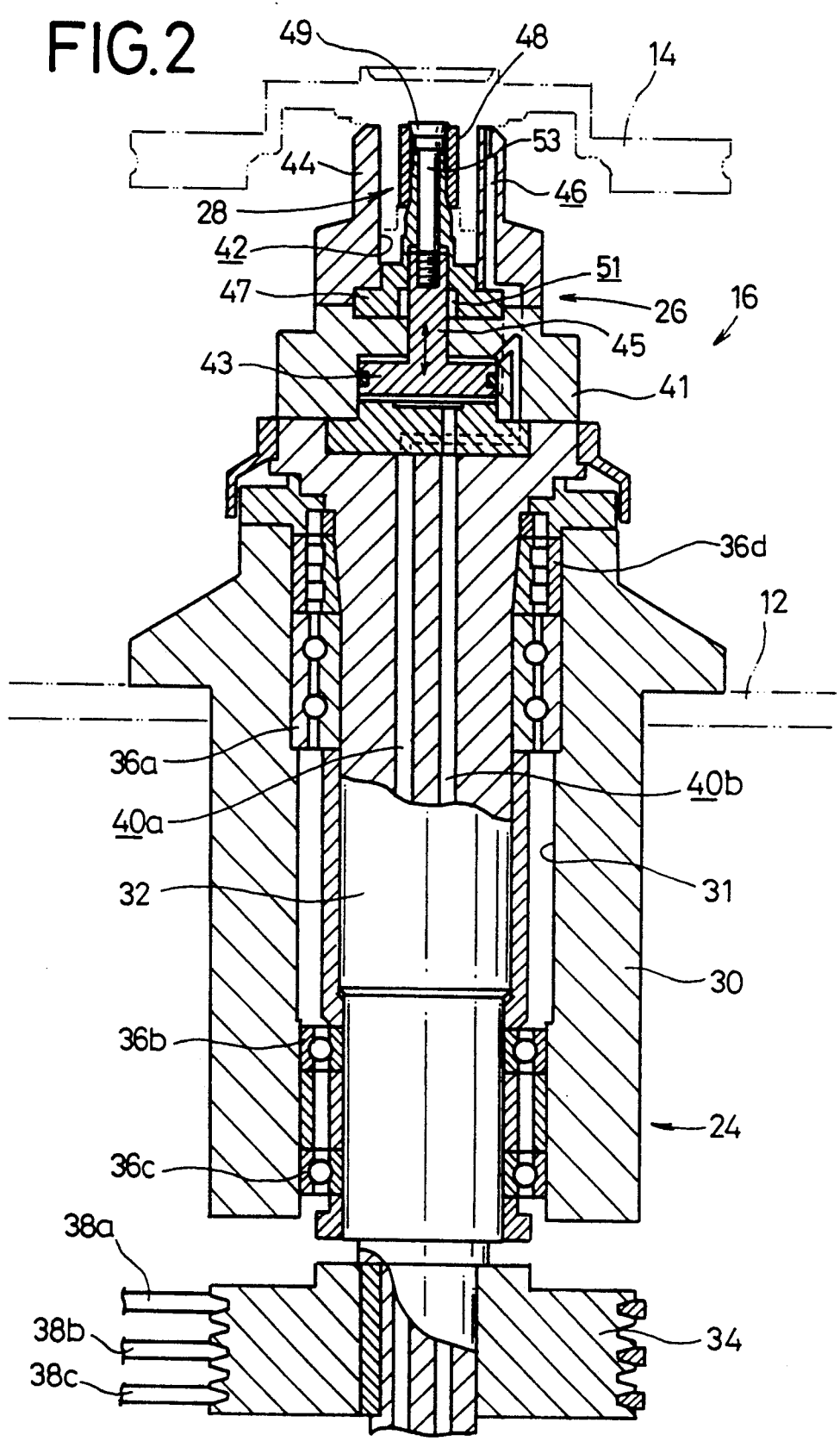
FIG. 2 is a vertical cross-sectional view of a spindle mechanism of the disc cutting apparatus.

As shown in FIG. 2, the rotating mechanism 16 includes a drive unit 24, a spindle unit 26, and a collet unit 28. The drive unit 24 comprises a rotatable shaft 32 fitted in an axial hole 31 defined in a cylindrical housing 30, and a pulley 34 fixedly fitted over the lower end of the rotatable shaft 32. The rotatable shaft 32 is rotatably supported by a plurality of bearings 36a, 36b, 36c, 36d in the hose 31 in the housing 30. Endless belts 38a, 38b, 38c are trained around the pulley 34 and a pulley on the shaft of a motor (not shown). The rotatable shaft 32 has axial fluid passages 40a, 40b defined therein which communicates with a pressure fluid source (not shown).

The spindle unit 26 engages the upper distal end of the rotatable shaft 32, and is used to secure the disc rotor 14.

More specifically, as shown in FIG. 2, the spindle unit 26 comprises a stepped cylinder 41 mounted on the upper distal end of the rotatable shaft 32, and a stepped cylindrical seat 44 fixedly mounted on the upper end of cylinder 41. The collet unit 28 is positioned in a cylindrical recess 42 defined in the seat 44. A piston 43 is displaceably disposed in the cylinder 41 and has a piston rod 45 axially extending therefrom into a hole 51 defined in a guide 47 that is disposed in the seat 44. The piston rod 45 has a distal end to which there is fastened a rod 53 engaged by a tightening member 49 having a tapered surface. A collet 48, which is disposed around the rod 53, can be spread radially outwardly by the tightening member 49. The seat 44 has a compressed air passage 46 for ejecting air to scatter chips off the disc rotor 14.

The presser mechanism 18 is positioned above the rotating mechanism 16 with the disc rotor 14 interposed therebetween, as shown in FIG. 1.

Figure 3:
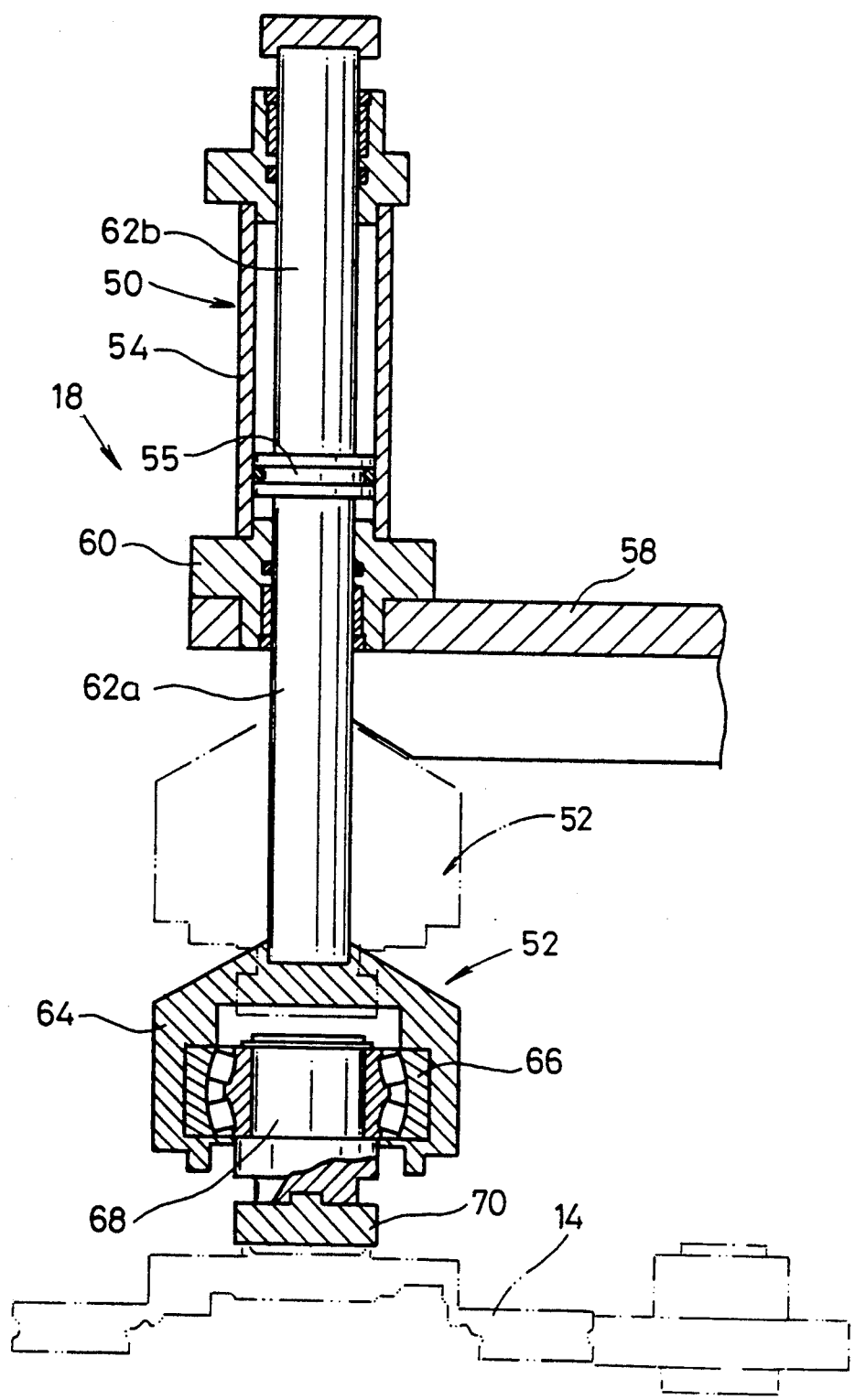
FIG. 3 is a vertical cross-sectional view of a presser mechanism of the disc cutting apparatus.

As shown in FIG. 3, the presser mechanism 18 includes an actuator 50 and a presser 52 which is vertically movable by the actuator 50. A bracket 58 extends horizontally from a support column 56 (see FIG. 1) which is vertically mounted on the casing 12. The actuator 50 comprises an upwardly extending cylinder 54 mounted on an attachment seat 60 mounted on an upper surface of the distal end of the bracket 58. A piston 55 is slidably disposed in the cylinder 54, and two piston rods 62a, 62b extend coaxially from the opposite ends of the piston 55 in opposite directions. A presser 52 is mounted on the distal lower end of the piston rod 62a. The presser 52 comprises a housing 64, a spherical roller bearing 66, and a presser member 70. The housing 64 is substantially tubular in shape, and the spherical roller bearing 66 having a spherical seat is disposed in the housing 64. A shaft 68 is supported by the spherical bearing 66 and extends downwardly. The presser member 70 is mounted on the lower distal end of the shaft 68 for pressing engagement with a central region of the disc rotor 14 which is placed on the seat 44 of the rotating mechanism 16.

The spherical roller bearing 66 of the presser mechanism 52 is effective to cause the presser member 70 to press the disc rotor 14 against the disc rotor 16 under constant pressure at all times. More specifically, when the axis of the cylinder 54 and the axis of the disc rotor 14 are inclined out of alignment with each other for some reason, the shaft 68 mounted on the presser member 70 displaces the inner race of the spherical roller bearing 66 under forces applied from the presser member 70 to the disc rotor 14, and the displacement, which may be vertical or circumferential, is borne by the spherical surface of the spherical roller bearing 66. As a result, the presser member 70 presses the disc rotor 14 against the disc rotor 16 under constant pressure at all times.

Figure 4:
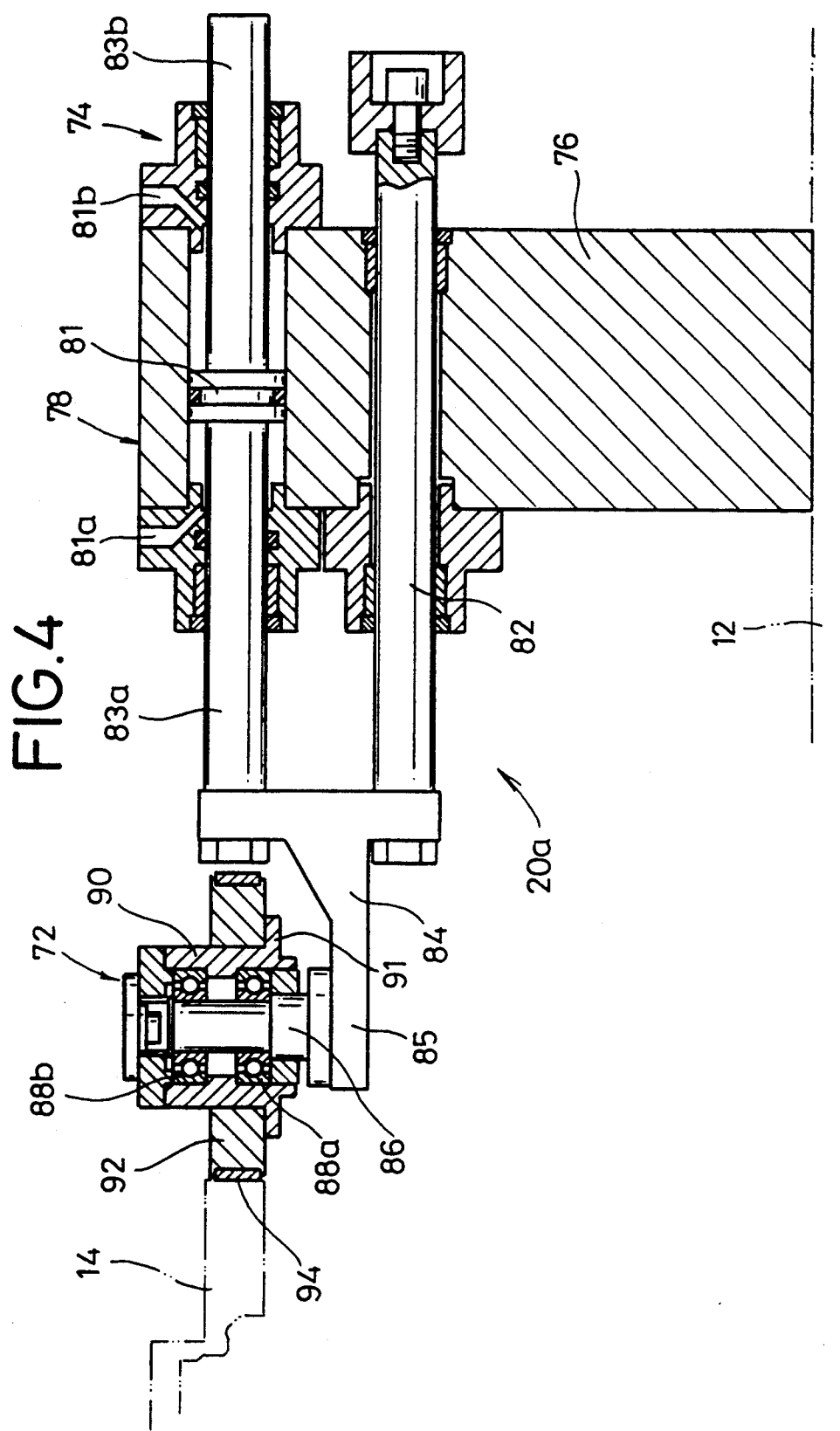
FIG. 4 is a vertical cross-sectional view of a holder mechanism of the disc cutting apparatus.

As shown in FIG. 4, each of the holder mechanisms 20a, 20b, 20c comprises a presser 72 for pressing an outer circumferential surface of the disc rotor 14 fixedly mounted on the rotating mechanism 16, and an actuator 74 for horizontally moving the presser 72 back and forth. The actuator 74 has a cylinder 78 mounted on and extending horizontally perpendicularly to a support column 76 extending upwardly from an upper surface of the casing 12. A guide rod 82 is supported on the support column 76 below the cylinder 78 and extends horizontally perpendicularly to the support column 76. The actuator 74 also has a piston 81 slidably disposed in the cylinder 78, and two piston rods 83a, 83b extend from the opposite surfaces of the piston 81 in opposite directions, and have portions extending out of the cylinder 78. Two ports 81a, 81b for supplying a fluid under pressure open into the cylinder 78. A support block 84 is fixed to the distal ends of the piston rod 83a and the guide rod 82, the support block 84 having a horizontally extending support plate 85.

The presser 72 is mounted on the horizontal plate 85. More specifically, an upwardly extending shaft 86 is mounted on an upper surface of the support plate 85, and a cylindrical housing 90 is rotatably supported on the shaft 86 by bearings 88a, 88b. The cylindrical housing 90 has a flange 91 on a lower end thereof. A side roller 92 is fitted over the cylindrical housing 90 and supported on the flange 91. A cushioning member 94 of synthetic rubber or resin, for example, is securely attached to the outer circumferential surface of the side roller 92.

In the case where the disc rotor 14 has recesses or protrusions on its outer circumferential surface, the cushioning member 94 may have complementary protrusions or recesses for engagement with the recesses or protrusions of the disc rotor 14.

As illustrated in FIG. 5, the cutting mechanism 22 has a base 95 and a cutting unit 98 having a pair of cutters or tool bits 96a, 96b for cutting the disc rotor 14, the cutting unit 98 being mounted on the base 95. The cutting mechanism 22 includes a bracket 100 with the detector 102 mounted thereon. The detector 102 has a probe 104 positioned more closely to the rotating mechanism 16 than the cutters 96a, 96b. When the probe 104 contacts the disc rotor 14 supported by the rotating mechanism 16, the detector 102 generates an electric signal which is supplied as a feedback signal to an NC (numerical control) system for positioning the cutting unit 98 with respect to the disc rotor 14. A rotary actuator 106 is mounted on the base 95 for angularly moving the rotary actuator 106 in the directions indicated by the arrows in FIG. 5. When the cutting unit 98 cuts the disc rotor 14, the rotary actuator 106 is operated in a direction to angularly move the bracket 100 to displace the probe 104 away from the disc rotor 14.

The cutting unit 98 also includes a first cutter holder rod 108a which holds the cutter 96a and a second cutter holder rod 108b which holds the cutter 96b, and first and second actuators 110a, 110b for displacing the first and second cutter holder rods 108a, 108b in the directions indicated by the arrows. The first actuator 110a includes a piston 111a having a piston rod 114a whose distal end is engaged by a support 116a that is positioned in a cavity 97a of a circular cross section defined the base 95. The support 116a is fastened to a side wall of the first cutter holder rod 108a by a screw 115a. The second actuator 112a comprises a piston 113a having a piston rod 117a whose distal end abuts against the side wall of the first cutter holder rod 108a.

The base 95 has fluid supply passages 119a, 121a defined therein for supplying a fluid under pressure to displace the pistons 111a, 113a.

The second actuator 110b for displacing the second cutter holder rod 108b is of the same structure as that of the first actuator 110a. The components of the second actuator 110b are denoted by similar reference numerals with a suffix "b".

The first and second cutter holder rods 108a, 108b extend horizontally within the base 95, and are supported on a shaft 123.

The cutting unit 98 is movable toward and away from the disc rotor 14 by rotary actuators 126, 128 (see FIG. 1) through ball screws.

Operation of the disc cutting apparatus of the above arrangement will be described below.

First, the disc rotor 14 to be cut is fitted over the collet 48, and the tightening member 49 of the collet unit 28 is moved downwardly by the piston 43 to spread the collet 48 radially outwardly, clamping the collet 48 against the inner wall surface of the cylindrical recess 42 for thereby securely holding the disc rotor 14 on the rotating mechanism 16.

Then, the cylinder 54 of the presser mechanism 18 is actuated to displace the presser 52 downwardly toward the center of the disc rotor 14. The presser member 70 is then brought into pressed engagement with the disc rotor 14, and the inner race of the spherical roller bearing 66 is caused to slide against the spherical surface thereof by the shaft 66. Therefore, the floating inner race of the spherical roller bearing 66 absorbs the displacement of the shaft 68. As a result, the presser member 70 can press the disc rotor 14 under uniform pressure against the rotating mechanism 16.

Then, the cylinders 78 of the respective holder mechanisms 20a, 20b, 20c are actuated to displace the support blocks 84 and the side rollers 92 toward the rotor disc 14 until the cushioning members 94 are held against the outer circumferential surface of the disc rotor 14. The holder mechanisms 20a, 20b, 20c therefore press the disc rotor 14 radially inwardly under uniform pressure. If the outer circumferential surface of the disc rotor 14 has recesses or protrusions, then they are engaged by respective protrusions or recesses of the cushioning members 94 of the side rollers 92, as described above.

Thereafter, the rotary actuators 126, 128 are operated to displace the cutting mechanism 22 toward the disc rotor 14. When the cutting mechanism 22 reaches a predetermined position near the disc rotor 14, the rotary actuator 106 is activated to turn the bracket 100 until the probe 104 of the detector 102 abuts against the disc rotor 14. The detector 102 now generates and transmits a position feedback signal to the NC system, which then operates the first actuators 110a, 110b and the second actuators 112a, 112b to set up a distance between the cutters 96a, 96b. That is, a fluid is supplied under pressure through the passages 121a, 121b to displace the pistons 111a, 111b, 113a, 113b toward each other until the cutters 96a, 96b are spaced a desired distance from each other. The four pistons 111a, 111b, 113a, 113b are effective to turn the first and second cutter holder rods 108a, 108b accurately about the shaft 123.

After the cutters 96a, 96b have thus been positioned with respect to the disc rotor 14, the rotary actuator 106 is operated again to move the probe 104 away from the disc rotor 14. Thereafter, the motor of the rotating mechanism 16 is energized to cause the belts 38a, 38b, 38c, the pulley 34, and the rotatable shaft 32 to rotate the disc rotor 14. The cutters 96a, 96b now cut the opposite surfaces of the disc rotor 14 which is being rotated. Since the central region of the disc rotor 14 is pressed against the rotating mechanism 16 by the presser member 70 and the outer circumferential surface of the disc rotor 14 is pressed radially inwardly by the side rollers 92 of the respective pressers 72 under uniform pressure, the disc rotor 14 is prevented from being displaced circumferentially and axially. Therefore, no chatter mark is produced on the surfaces of disc rotor 14 when they are cut by the cutters 96a, 96b. When the disc rotor 14 is in rotation, the cutters 96a, 96b are moved radially outwardly or inwardly with respect to the disc rotor 14 to radially cut the opposite surfaces thereof. During this time, air under compression is ejected from the passage 46 to blow chips outwardly away from the disc rotor 14. After the disc rotor 14 has been cut, the actuators 110a, 110b, 112a, 112b are inactivated, i.e., a fluid under pressure is supplied through the fluid supply passage 119a to the pistons 111a, 111b, 113a, 113b for thereby angularly displacing the first and second cutter holder rods 108a, 108b away from each other, moving the cutters 96a, 96b off the corresponding surfaces of the disc rotor 14. The motor of the rotating mechanism 16 is de-energized, and the cylinders 78 of the holder mechanisms 20a, 20b, 20c and the cylinder 54 of the presser mechanism 18 are inactivated, moving the presser member 70 and the side rollers 92 off the disc rotor 14. The disc rotor 14 is then detached from the seat 44. Another disc rotor 14 to be cut is fitted into the seat 44, and then cut in the same manner as described above.

The disc cutting apparatus according to the present invention offers the following advantages:

While a workpiece which is being rotated by the rotating mechanism is pressed radially inwardly by the holder mechanisms under uniform pressure, at least one surface of the workpiece is cut by the cutter of the cutting mechanism. Therefore, the workpiece is prevented from vibrating, and also from being displaced circumferentially and axially, by the holder mechanisms while the workpiece is being cut. Therefore, no chatter mark is produced on the workpiece being cut, and the workpiece is cut to a smooth finish in one cutting operation.

Although a certain preferred embodiment of the present invention has been shown and described in detail, it should be understood that various changes and modifications may be made therein without departing from the scope of the appended claims.

What is claimed is:

1. A disc cutting apparatus comprising:
   rotating means for positioning and rotating a disc-shaped workpiece;
   a plurality of holder mechanisms for holding said workpiece while permitting rotation of said workpiece about an axis thereof, each of said holder mechanism comprising side rollers disposed about a circumferential edge of said disc-shaped workpiece for pressing, under uniform pressure, said edge of the workpiece radially inwardly toward an axis of the workpiece about which the workpiece is rotated by said rotating means;
   a cutting mechanism for cutting the workpiece while the workpiece is being rotated by said rotating means and pressed by said holder mechanisms; and
   detecting means for producing positional information to position said cutting mechanism with respect to the workpiece.

2. A disc cutting apparatus according to claim 1, further comprising a presser mechanism for pressing a central region of the workpiece, and a plurality of actuators coupled respectively to said side rollers, for pressing said side rollers against said circumferential edge of the workpiece.

3. A disc cutting apparatus according to claim 2, wherein said presser mechanism comprises an actuator, a housing coupled to said actuator, a spherical roller bearing disposed in said housing, and a presser member supported on said spherical roller bearing for pressing the central region of the workpiece.

4. A disc cutting apparatus according to claim 1, wherein said detecting means comprises a probe for engaging the workpiece to produce said positional information.

5. A disc cutting apparatus according to claim 1, wherein said rotating means comprises a spindle mechanism, said spindle mechanism having a seat for supporting the workpiece fitted therein, and a collet disposed in said seat for securing the workpiece.

6. A disc cutting apparatus according to claim 1, wherein said rotating means includes workpiece seating means for holding the workpiece seated thereon and rotating the workpiece with said rotating means.

7. A disc cutting apparatus according to claim 6, wherein said workpiece seating means has a fluid passage for supplying a fluid to remove chips from the workpiece.

8. A disc cutting apparatus according to claim 6, wherein said workpiece seating means comprises a collet, a tightening member associated with said collet, and a linear actuator for causing said tightening member to spread said collet to hold the workpiece.

9. A disc cutting apparatus according to claim 8, wherein said linear actuator comprises a fluid pressure cylinder.

10. A disc cutting apparatus according to claim 1, and further comprising a plurality of actuators coupled respectively to said side rollers for moving said respective side rollers into and out of abutment against the workpiece.

11. A disc cutting apparatus according to claim 10, wherein each of said side rollers includes a cushioning member mounted thereon for engaging the workpiece.

12. A disc cutting apparatus according to claim 1, wherein said cutting mechanism comprises first and second cutter holder rods displaceable transversely with respect to the workpiece, and linear actuator means having a movable member engaging said first and second cutter holder rods.

13. A disc cutting apparatus according to claim 12, wherein said linear actuator means comprise at least one fluid pressure cylinder associated with each of said first and second cutter holder rods.

14. A disc cutting apparatus according to claim 13, wherein said fluid pressure cylinder has a piston rod, and a support coupled to a distal end of said piston rod and held against each of said first and second cutter holder rods, for positionally adjusting each of said first and second cutter holder rods in response to operation of said fluid pressure cylinder.

* * * * *